(12) United States Patent
Whitten et al.

(10) Patent No.: US 8,150,731 B1
(45) Date of Patent: *Apr. 3, 2012

(54) METHOD AND SYSTEM PRESENTING AND DISTRIBUTING CUSTOMIZED INFORMATION ASSOCIATED WITH VERIFICATION INFORMATION

(75) Inventors: Gordon Whitten, Omaha, NE (US);
Katherine A. Burton, Omaha, NE (US);
Chad E. Bokowski, Omaha, NE (US)

(73) Assignee: Sojern, Inc., Omaha, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 12/945,157

(22) Filed: Nov. 12, 2010

Related U.S. Application Data

(63) Continuation-in-part of application No. 12/150,138, filed on Apr. 25, 2008.

(60) Provisional application No. 61/261,066, filed on Nov. 13, 2009.

(51) Int. Cl.
*G06Q 40/00* (2006.01)

(52) U.S. Cl. .................. 705/14.4; 705/14.49; 705/14.58

(58) Field of Classification Search .............. 705/10–44
See application file for complete search history.

(56) References Cited

U.S. PATENT DOCUMENTS

| | | | |
|---|---|---|---|
| 3,970,332 A | 7/1976 | Alford, Jr. | |
| 5,855,006 A | 12/1998 | Huemoeller et al. | |
| 6,285,991 B1* | 9/2001 | Powar | 705/76 |
| 6,804,659 B1 | 10/2004 | Graham et al. | |
| 6,983,272 B2 | 1/2006 | Davis et al. | |
| 7,035,812 B2 | 4/2006 | Meisel et al. | |
| 7,050,986 B1 | 5/2006 | Vance et al. | |
| 7,559,217 B2* | 7/2009 | Bass | 70/40 |
| 7,692,652 B2* | 4/2010 | Parenteau et al. | 345/426 |
| 2004/0245335 A1 | 12/2004 | Al Amri | |
| 2005/0258231 A1 | 11/2005 | Wiater | |
| 2006/0271552 A1 | 11/2006 | McChesney et al. | |
| 2007/0185982 A1 | 8/2007 | Nakanowatari et al. | |

* cited by examiner

*Primary Examiner* — Frantzy Poinvil
(74) *Attorney, Agent, or Firm* — Suiter Swantz pc llo

(57) ABSTRACT

The present disclosure is a method and system for providing targeted content with verification information including additional selectable content. A method for providing targeted content with verification information may include receiving data associated with verification information, the receiving of data associated with verification information may include time information and location information; retrieving content related to the verification information, the content being based upon the time information and the location information; and presenting verification information, the verification information including targeted content related to the verification information and based upon the time information and location information.

21 Claims, 9 Drawing Sheets

Print Boarding Pass ▼

✓ Check Additional Pages to Print with Your Boarding Pass

Business
- ☐ Business News Editorials
- ☐ Management Trends Report
- ☐ Investing Hot List

- ☐ Sports Highlights
- ☐ Gone Green
- ☐ Tech & Gadgets
- ☐ Book Tour
- ☐ Auto Enthusiasts
- ☐ Golf Enthusiasts ▼

Travel Tips
- ☐ Preparing to Fly
- ☐ Car Rental Locations ▼

Family
- ☐ Coloring Pages
- ☐ Kid Travel Safety Tips  1 page ▼

Leisure
- ☐ Shopping
- ☐ Best Sellers List ▼

▼ Click here to see more or visit us at sojern.com for a full listing.

☑ Trip Planning Checklist
☑ Receipt Copy of Boarding Pass     [ XX pages ]   [ Print Now ]

FIG. 8

Print Boarding Pass ▼

✓ Check Additional Pages to Print with Your Boarding Pass

Business
- ☐ Business News Editorials
- ☐ Management Trends Report
- ☐ Investing Hot List
- ☐ Careers
- ☐ Innovation
- ☐ Media & Advertising

- ☐ Sports Highlights
- ☐ Gone Green
- ☐ Tech & Gadgets
- ☐ Book Tour
- ☐ Auto Enthusiasts
- ☐ Golf Enthusiasts
- ☐ Real Estate
- ☐ Words of the Day
- ☐ Crossword Puzzles
- ☐ Jest News
- ☐ Sudoku ▲

Travel Tips
- ☐ Preparing to Fly
- ☐ Car Rental Locations
- ☐ Airport Maps
- ☐ Extended/Detailed Weather
- ☐ Health Club Directory ▲

Family
- ☐ Coloring Pages
- ☐ Kid Travel Safety Tips
- ☐ Children's Stories
- ☐ Puzzles
- ☐ Fall Family Fun ▲

Leisure
- ☐ Shopping
- ☐ Local Attractions & Events
- ☐ Local Dining Top Picks
- ☐ Daily Horoscope
- ☐ Fall Fashion Trends ▲

▲ See more printables at sojern.com

☑ Trip Planning Checklist
☑ Receipt Copy of Boarding Pass

[ XX pages ]  [ Print Now ]

FIG. 9

METHOD AND SYSTEM PRESENTING AND DISTRIBUTING CUSTOMIZED INFORMATION ASSOCIATED WITH VERIFICATION INFORMATION

CROSS REFERENCE TO RELATED APPLICATION

The present application claims the benefit under 35 U.S.C. §119 of U.S. Provisional Application Ser. No. 61/261,066, filed Nov. 13, 2009. The present application also claims the benefit under 35 U.S.C. §120 of U.S. patent application Ser. No. 12/150,138 filed Apr. 25, 2008. Said U.S. Provisional Application Ser. No. 61/261,066, filed Nov. 13, 2009 and U.S. patent application Ser. No. 12/150,138, filed Apr. 25, 2008 are hereby incorporated by reference in their entirety.

FIELD

The present disclosure relates generally to the field of targeted content delivery and more particularly to a method and system for providing targeted content associated with verification information, including providing selectable customized information.

BACKGROUND

Verification information, including a ticket, confirmation document, boarding pass and the like may be utilized for verification of identity, reservation, transaction, access and the like. Verification information, hereinafter referred as a pass, may include a date, time, location and other information. The pass may further include a bar code or similar authentication to verify authenticity of the pass.

A pass may be produced by a distributor of the pass. For example, when purchasing passes for a concert, the distributor of the passes may mail the passes produced by the distributor to the purchaser. Alternatively, a purchaser may purchase passes by accessing an on-line, web-based system. After providing an authenticated entry to request the verification information, usually through a secure login and password, a user may retrieve the pass. The pass may be presented in a printable form including name, date and authentication information, such as a bar code, whereby a user may print the one or more passes to gain entry into the flight, event and the like.

SUMMARY

The present disclosure is directed to a method and system for providing targeted content with verification information. A method for providing targeted content with verification information may include receiving data associated with verification information, the receiving of data associated with verification information may include time information and location information; retrieving content related to the verification information, the content being based upon the time information and the location information; and generating targeted content related to the verification information and based upon the time information and location information with the verification information.

In an embodiment of this disclosure, customers printing verification information may be presented with additional selectable content options that are relevant to a specific destination, date and time, or other demographic information along with specific content desirable to particular customers. Content such as upcoming events, business news editorials, news and sports highlights, coloring pages, book synopsizes, trip planning check lists, and other similar relevant content may be presented as additional content selections for a user which may be presented and formatted for printing on at least one page.

It is to be understood that both the foregoing general description and the following detailed description are exemplary and explanatory only and are not restrictive of the disclosure as claimed. The accompanying drawings, which are incorporated in and constitute a part of the specification, illustrate an embodiment of the disclosure and together with the general description, serve to explain the principles of the disclosure.

BRIEF DESCRIPTION OF THE DRAWINGS

The numerous advantages of the present disclosure may be better understood by those skilled in the art by reference to the accompanying figures in which:

FIG. 8 depicts an exemplary graphical user interface of a limited number of content options for selection by a user; and FIG. 9 depicts an exemplary graphical user interface of an expansive list of content options for selection by a user.

DETAILED DESCRIPTION

Figure 1:
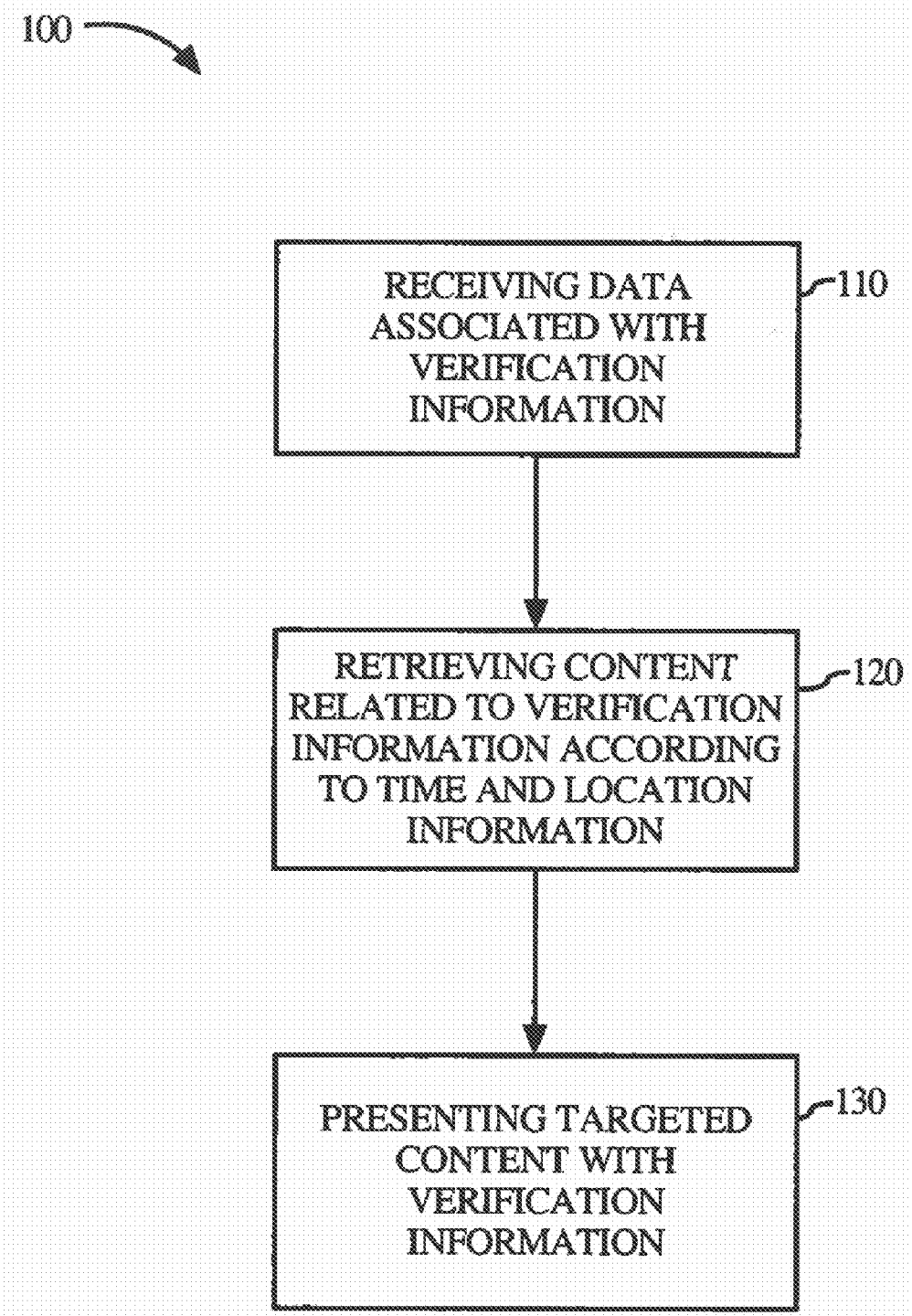
FIG. 1 depicts a method for providing targeted content with verification information.

Reference will now be made in detail to the presently preferred embodiments of the disclosure, examples of which are illustrated in the accompanying drawings.

Currently, itineraries, tickets, airline boarding passes, and other verification information may be accessible online for viewing and printing. The method and system of the present disclosure may generate a plurality of information customized to each specific user for their specific event that is relevant to the specific user for viewing and printing with the verification information.

Referring to FIGS. 1-9, embodiments of a method and system for providing targeted content with verification information are shown. Targeted content may refer to customized or personalized content which has been gathered, assembled, altered or filtered to particular specifications, such as a location parameter and time parameter. For example, a large number of pieces of content may be reduced to a small number of pieces of content based upon particular specifications, including a location parameter and time parameter. Targeted content may also be filtered on the basis of gender, travel history, user interests and the like. Advantageously, the targeted content may be supplied with verification information to provide an efficient and convenient interface for delivery of the targeted content. Verification information may be items which are regularly utilized, such as boarding passes, tickets, reservation confirmation documents, automated teller machine receipts, sales receipts and the like. As a result, the generation of targeted content customized for a particular user may be included with the verification information. When the verification information is printed, the printed document may be utilized as the verification information while the printed document further includes targeted content.

One embodiment of the method and system for providing targeted content with verification information is providing targeted content with a boarding pass. While an on-line boarding pass check-in process improves efficiency for users and airline personnel, it does not provide helpful information to users related to their interests, trip needs, or trip destination. As a result, most boarding passes are discarded by users at, or shortly after, boarding the airplane because they contain no information of value except for seat assignment or boarding group.

Additionally, due to financial pressures, airlines are continually looking for additional forms of revenue by leveraging various airline assets. One form of revenue for airlines is advertising. Airlines have significantly increased advertising on airplanes in such places as tray tables, seat back catalogs, video monitors, sick bags, and napkins. While these advertising mediums offer a large number of advertising impressions to large scale brand advertisers and product marketers, they do not provide targeted content and targeted advertising to individual users or like groups based on user profiles. These advertising mediums are also not conducive to local advertisers reaching users who are flying into their community because they are shown to all users not just the ones coming to their community. Even national advertisers have few means to reach targeted groups of users because the broad scale advertising available on airlines is typically shown to everyone. The boarding pass check-in process represents an area for targeted content delivery to a particular user.

Referring to FIG. 1, a flow chart depicting a method 100 for providing targeted content with verification information is shown. Method 100 for providing targeted content with verification information may include receiving data associated with the verification information 110. Data associated with verification information may include name or identity information, gender information, time information and location information and the like. It is contemplated that gender information may be based on identity information or a gender determination may be completed from name information. Verification information may refer to any type of information which may provide confirmation of identity, purchase, reservation, access and the like. It is contemplated that verification information may refer to a pass, ticket, confirmation document, receipt and the like. For example, verification information may refer to a boarding pass for entry onto a commercial flight. Data associated with the boarding pass may include a name, a time and date of a flight, a connecting flight, a destination and return flight(s). Method 100 may include retrieving content related to verification information and based upon time information and location information 120. Content may include information, such as graphics, images and text associated and related to the verification information. Content may include advertisements and may provide informative information for users at a particular time and location. The content may be further based upon the time information and location information, providing targeted content which is of a special interest to a user. Method 100 may further include generating targeted content for delivery and placement with verification information 130. While verification may include a tangible item, such as a paper pass or ticket, verification information may also be implemented in an electronic form, such as a pass code and the like. It is contemplated that a generator of the verification information, such as an airline, may operate with method 100 for providing targeted content associated with the verification information whereby the verification information may include the targeted content. Alternatively, the generator of verification information may include an airline whereby the airline executes method for providing targeted content with boarding passes associated with the airline.

Figure 2:
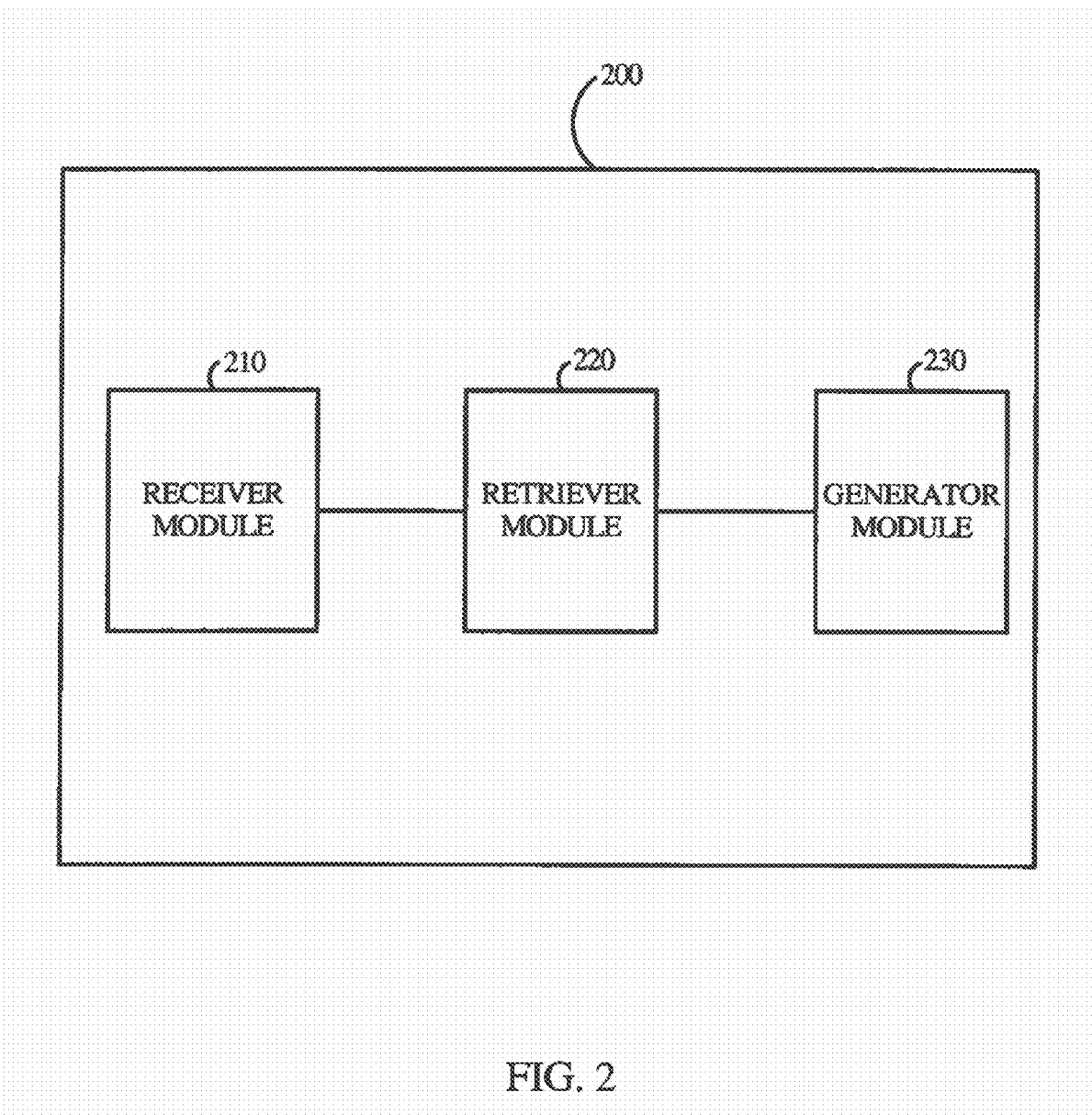
FIG. 2 depicts a system for providing targeted content with verification information.

Referring to FIG. 2, a system 200 for providing targeted content with verification information is shown. System 200 may comprise a plurality of modules which may execute one or more steps of method 100 for providing targeted content with verification information. System 200 may be a computing system, such as a server. Computing system may include a processing unit, a memory unit, a program of instructions stored on non-transitory computer readable media which execute the program of instructions.

System 200 may include a receiver module 210, a retriever module 220 and a generator module 230. Receiver module 210 may receive data associated with verification information. Receiver module 210 may include an on-line web-based server. It is contemplated that data may be parsed during a transaction associated with verification information. For example, when a user desires to print a boarding pass, they may access an airline website. As such, the airline website may retrieve a record of a reservation of the user. Receiver module 210 may parse data associated with the boarding pass, such as a name, date of flights and a destination. In a sales transaction, such as a reservation, similar data may also be parsed and received by receiver module 210. Retriever module 220 may retrieve targeted content related to verification information based upon data received from verification information, including gender information, time information and location information. Retriever module 220 may include an Internet search engine and database access. Generator module 230 may generate and present targeted content for delivery and placement with verification information. The presentation of targeted content with verification information may be suitable for printing on a sheet of paper and may be suitable for electronic presentation, such as through a mobile device, such as cellar phone, smart phone, personal digital assistant, tablet computing device and the like. It is contemplated that modules 210-230 may refer to programs of instructions, such as software code, executable by a processor, processing system, computing system and the like designated to perform one or more functions. It is further contemplated that modules 210-230 may be performed by one or more processors, computing systems and the like, in a networked computing system. Computing system may include memory for storage of content, a network interface for searching data from a worldwide network, such as the Internet, and a processing unit for executing instructions to perform functions as described by modules 210-230.

Figure 3:
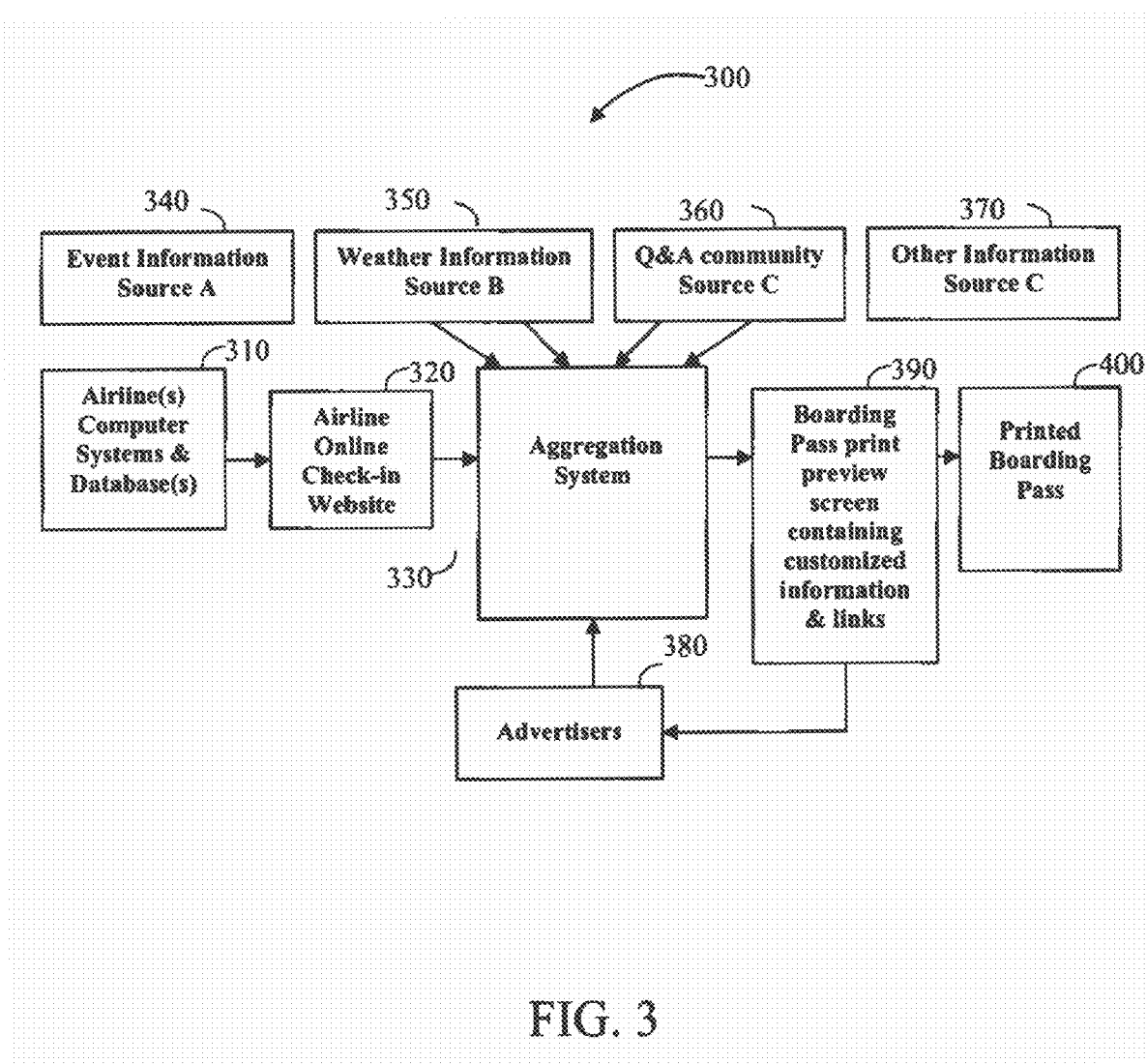
FIG. 3 depicts an exemplary system for providing targeted content with a boarding pass.

In an embodiment, a system for providing targeted content with verification information may be a system for generating customized boarding passes for airline flight access. Referring to FIG. 3, an exemplary system 300 for generating a customized boarding pass in accordance with an embodiment of the present invention is shown. System 300 may execute method 100 for providing targeted content with verification information and may be an embodiment of system 200. System 300 may include one or more airline computer systems and user databases 310, one or more airline websites 320, an aggregation system 330 to aggregate information sources and advertisers 340-380 that may be of interest to users. For example, it is contemplated that aggregation system for producing targeted content with a boarding pass is operable with a plurality of commercial airlines, such as United and American Airlines. An information or advertising source 340-380 may refer to any information source that may be accessed electronically in order to present targeted content to the specific users or groups of like users. Once information is aggregated and matched with users who may benefit from that information through the aggregation system 330, the information may be presented to users at the boarding pass print screen 390, providing an electronic interface, such as a graphical user interface of verification information. The boarding pass print screen 390 may include clickable links or other connections to advertisers 380 whose information was aggregated and matched with the user in the database and system 330. The boarding pass print screen 390 may also include links or other connections to a plurality of other information sources 340-370 referenced on the boarding pass. The boarding pass may then be printed with the associated customized information and advertisements targeted to that particular user, a tangible, e.g. hard copy interface of verification information. A final printed boarding pass may contain additional customized information based upon the behavior of the user from the boarding pass print screen 390. This further customization may include providing the user with enhanced information or advertising based on the information sources viewed during the preview step, or during a check-in process.

Multiple information sources 340-380 may be accessed by the aggregation system 330 such as event ticketing companies, event promoters, weather information providers, map providers, restaurant reservation providers, transportation providers, hotels, or a plurality of other sources of information that may be of interest to users where presentment prior to departure might be beneficial. It is contemplated that aggregation system 330 may electronically access these information sources, and it is contemplated that the sources may pay for inclusion in the system. It is further contemplated that information sources may present offers, or coupons, to particular users that may fit, among a time and location parameter, among other demographic factors. Additional data concerning users may include a date of reservation, a class of service (e.g. first class), travel history and the like which may be employed to further refine target content provided to the user.

Additionally, a plurality of advertisers may provide targeted advertising messaging to specific users with profiles of interest. These profiles could include user information about such things as user city of origin, age, sex, propensity to travel, destination city, duration of trip, and level of airline ticket purchased. The aggregation system 330 may use this information to match advertisers and information sources with users who may be interested. It is contemplated that advertisers could also refine their advertising to reach only users who might be interested in their goods or service based on the type of product or service being sold.

For example, in an embodiment of the invention, a golf course might advertise to all male users between the age of 30 and 70 years traveling to San Diego who are staying at least three days. A retirement village in Las Vegas might advertise to all users above an age of 55 years arriving at Las Vegas during the month after their grand opening. An outdoor family entertainment center in Minneapolis may provide a coupon for free admission to children between the ages of 7 to 13 years traveling to Minneapolis during the summer months. An upscale branded bag company may advertise to all female users traveling in first class going to any destination during the first month after the launch of a new line of products.

It is contemplated that one or more airlines 310 or other sources providing verification information could link to the aggregation system 330. Aggregation system 330 may be associated with a particular airline, or a collection of sources providing verification information. It is further contemplated that the aggregation system 330 may include an authentication module for registration and access to a user profile. An ability to create or update a profile may further improve the information presented to that user. A given user may be able to click a link on the boarding pass preview screen 390 and update their profile in the aggregation system 330 or in the airline's frequent flier database. Profile information may include a plurality of information, including gender information, age information and travel history information. It is contemplated that the user may also provide user interests which may result in information and advertising that may be more valuable to that user. For example, in an embodiment of the disclosure, a 50 year old female user who travels regularly might select that she is interested in information about jewelry stores, craft shows, French restaurants, and all theatre events being performed during the time of trips to her destination cities. As such, targeted content on the boarding pass may include a sale at a jewelry store or the grand opening of a new French restaurant. A 30 year old male user who travels often may select that he is interested in information about all sporting events and concerts in the destination cities during the time of his travels. The modified profiles may further improve the quality of the targeted information and advertising to the specific user in the future.

Figure 4:
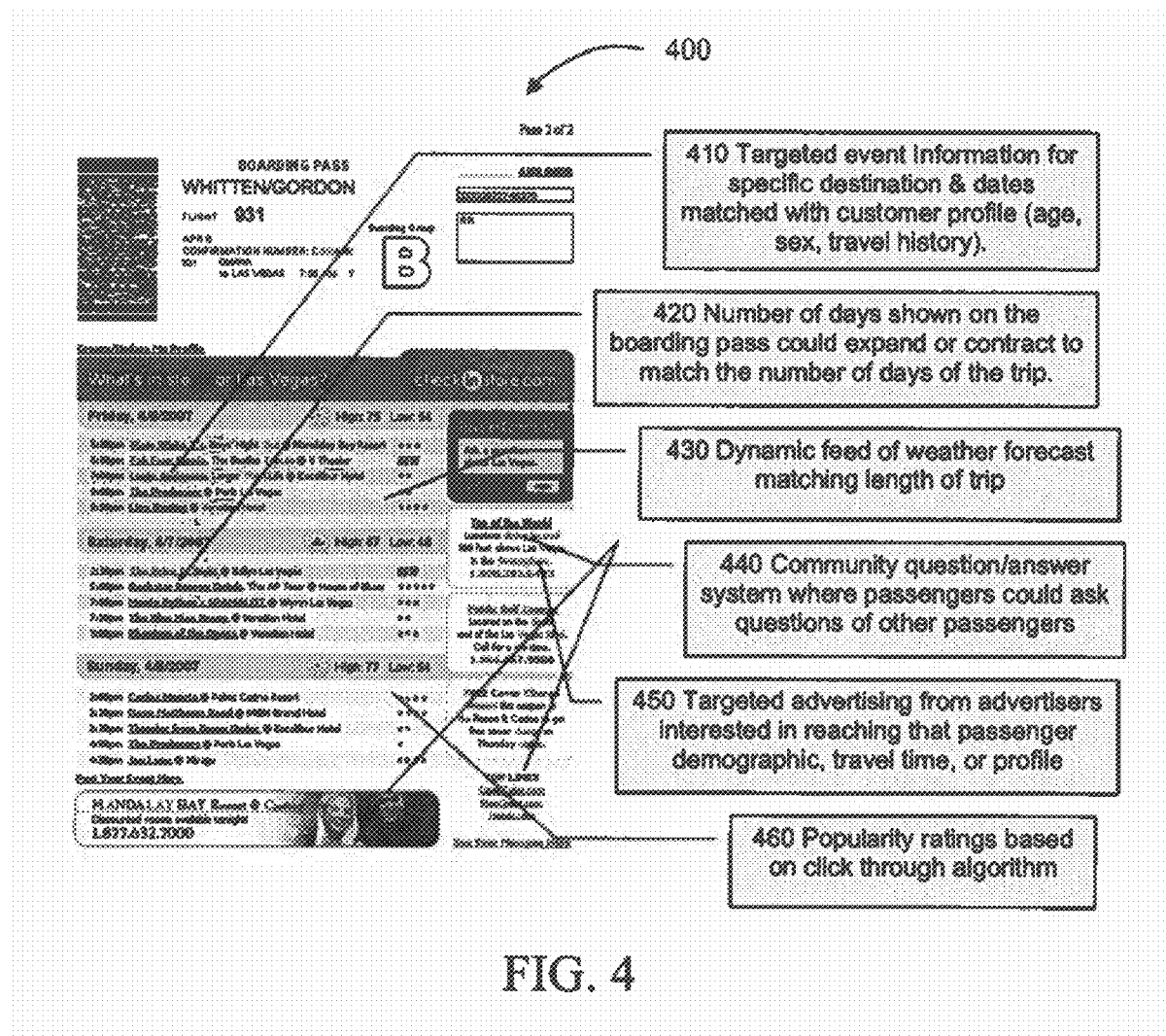
FIG. 4 depicts an exemplary boarding pass including targeted content.

Referring to FIG. 4, an exemplary diagram of a customized boarding pass 400 is shown. System 300 may produce boarding pass 400. Boarding pass 400 may include targeted event information 410 that is customized to the time and location of the user. The time and location of the user may refer to a geographical area, city, street address, airport and the like where the user is traveling and the time of day and particular days a person may be at the destination. The number of days, with corresponding information shown on the boarding pass, could dynamically expand or contract 420 depending on the arrival date to the destination and the departure date from the destination. Another common need when traveling is knowledge of the weather forecast for the days of a pending trip. While numerous sources of weather information exist on the Internet, they are not readily available without expending time and effort to find the specific information desired about where one is traveling. By presenting weather forecasting information that may match the probable length of the trip 430, the user would have valuable information without expending any effort. This information may be obtained though an electronic connection from a forecasting information source, weather source 350 of FIG. 3, saving the user the hassle of searching or printing the forecast separately. Targeted advertising may be purchased 450 through key word, visual, link based, search based or other advertising mechanisms that may be targeted to specific dates, destination, and user profiles. Advertisers may select narrow or wide targeting parameters based on the number of advertising impressions they wish to get and the degree of targeting they wish to achieve. This kind of targeting to specific user profiles and destinations would not be possible through traditional mechanisms of online advertising such as search or banner ads. Posted events and information could have popularity ratings 460 based on algorithms that may include the number of clicks on a specific piece of information listed on electronic boarding passes.

Even when valuable information may be provided on the boarding pass, users may commonly have questions regarding the location in which they are about to go. Because it is difficult to find answers to questions about specific communities, except through talking to other people familiar with the specific destination, the aggregation system 330 may match people potentially able to answer questions, with those people posing the question. An electronic interface to an online question and answer system 430 may be built into the electronically presented boarding pass so that users going to a specific destination could ask questions of others familiar with that destination. Those interested in answering questions about destinations where they have knowledge could agree to get notifications when questions are posted that they might be able to answer. Replies could come via email or text messages depending on the preferences of the asker.

Figure 5:
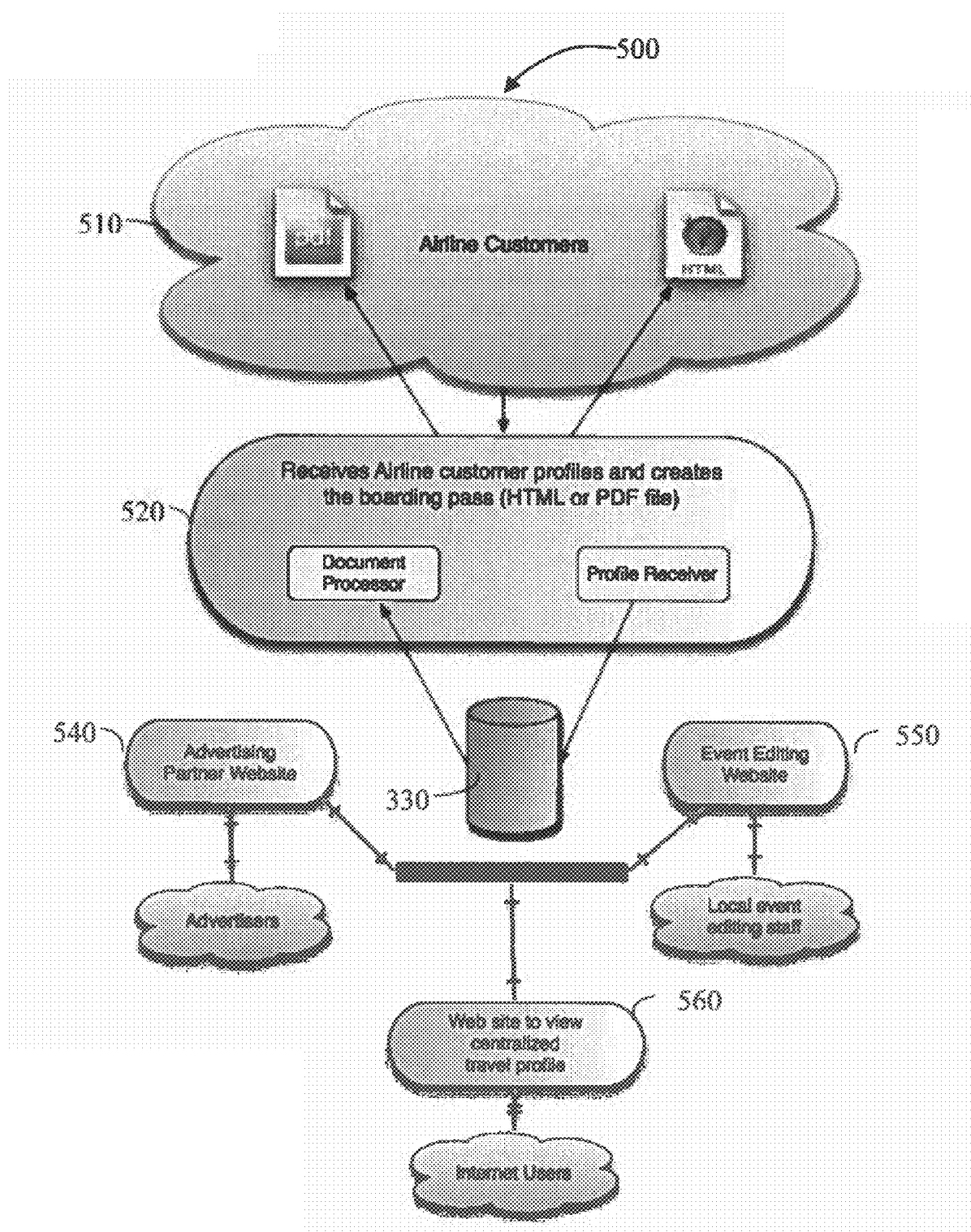
FIG. 5 depicts an exemplary architecture of a system for providing targeted content with verification information.

Referring to FIG. 5, an exemplary architecture of a system for providing targeted content with verification information is shown. In an embodiment, when airline customers check-in 510, aggregation system 330 may acquire profile information regarding customers 520. Airline users wishing to have a more detailed profile with preferences such as which types of restaurants or sporting events they enjoy could create or edit their profile in the database through a website to view and edit profile information 560. It is further contemplated that advertisers may have a website 540 to create advertisements and select the targeted users they wish to reach. This website may interact with the aggregation system 330. In a similar way, editors may have a website 550 to create, review, and update content that might be relevant to certain users traveling to certain destinations. This content may supplement other electronic information sources 340-370 as shown in FIG. 3. Once the matching is complete, data may be transmitted back to a document processor 520 capable of converting the matched information into a format that can be reviewed on a user's computer screen and printed 510. Common formats may include PDF, HTML and the like.

While an embodiment of a system and method for providing targeted content with boarding passes is described, it is contemplated that method 100 for providing targeted content with verification information may be employed with a variety of applications which employ some type of document, (electronic interface or hard copy interface) that may be utilized to verify identity, a transaction and the like. For example, method 100 may be employed with train reservations, car rental reservations, lodging reservations, concerts, sports events, movies, restaurant reservations, store receipts, automated teller machine receipts and the like. It is further contemplated that targeted advertising and targeted content related to a specific user profile and the destination which they are traveling may be presented to users through mobile devices in an electronic interface. Additionally, links may be provided where users may access the boarding pass content at a later time during the trip via a computer or mobile device to get updated content, purchase tickets, or schedule restaurant reservations. This may be available on an aircraft which includes wireless Internet access. As such, real time offers for the destination may be provided to the user by information sources. Offers may include discounts, coupons and the like in order to increase business in real-time. For example, a restaurant in an airport may target a user based upon their presence in the airport as part of a connecting flight.

Additionally, system 300 may be implemented with kiosks at airports for the printing of advertisements on the kiosk boarding pass. It is contemplated that kiosks and other printing devices may allow printing of customized and targeted content on both sides of boarding passes. System 300 may extend to luggage tags printed for checked baggage. Currently, luggage tags are printed at the airport when bags are checked. Those tags commonly contain the name of the user, the destination they are headed, and a bar code containing specific details about their trip. The same technology being used on the boarding pass could also be used to customize the luggage tag with targeted offers and provide that information to the specific user.

System 300 may be employed with flight confirmation email messages whereby the targeted information is offered at the time of booking but converted to the point in time where the booking is made. Furthermore, the interactions between the user and the information on the flight booking email message may be utilized to further enhance the offers and information presented to the user at the point of check-in on-line. This may provide a user behavioral targeting system that improves with each use of the system.

It is contemplated that the targeted content might adapt as the habits of a user change. A connecting flight or return flight home from an airport where the user is not familiar with the airport might bring the need for airport information to the forefront. One such example is information about the restaurants at the connecting or departure airport, including hours of operation and location relative to the user's terminal and gate of departure. Additional information related to that specific airport, such as wait times, security warnings, delays, and the like may be posted on the return boarding pass.

A boarding pass may provide an efficient and convenient location for the printing and inclusion of targeted web links or text codes for the user to access specific information relative to their specific trip in light of the time information, location information and/or their user profile. Although some of this information could be accessed through long and consuming mobile searches, it could never be accessed at the proper time, proper accuracy or speed of coordinating the specific links. One manifestation would include getting gate information at the airport before or between flights at a connecting airport. Because this information often changes, a link or SMS code may be placed on the boarding pass that would allow the user to quickly access the exact information for their specific flight. Such information may otherwise require time consuming searches with large amounts of data entry in order to retrieve on a mobile device. Another example would be real time offers at a departure or connecting airport relative to the exact time a user is arriving at that particular airport. For example, a parking company might offer a discounted rate on specific hours of the day when parking lots are not full. A restaurant in a connecting airport might create a "happy hour" offer because they have too few customers at a given time of day. A retailer might choose to offer specials to all female users who arrive with a certain coupon code on their mobile device for a given type of merchandise.

Additional Selectable Content

Method and system for providing targeted content may further include additional selectable content for viewing and printing on printable documents. As shown and described in FIGS. 1-5, method and system for providing targeted content may include targeted content printed on verification information, such as a boarding pass. It is contemplated that additional selectable content may be generated for a specific user, location information and date information. While a user may enjoy the content provided on the verification information document in an electronic or printable document (e.g. paper form), it may not allow as many content options as desired by the user. Method and system for providing targeted content may further include additional selectable content for viewing and printing on printable documents.

A number of content options may be presented which the user may select, view and print on a printable document in addition to the verification information. These options may be presented based on the behavior of the user. For example, if it were pre-determined that the user were a business user, the options presented may be related to business travel. Additionally, content selections, demographics and behaviors collected during this process may be retained to further enhance a process of providing relevant and meaningful content to the user and other users. For example, selected content options may be utilized for refining content options for similar users.

It is contemplated that the user may easily switch to a non-obtrusive expanded list of additional relevant content for which they can select to print as additions to their verification information, such as a boarding pass. In addition, the user may optionally link to a site that provides a directory of additional print options. Based upon the selections of a user, profiles of interest may be created. These profiles may include information about such things as user city of origin, age, sex, propensity to travel, destination city, duration of trip, level of airline ticket purchased, and previous travel information.

Multiple information sources may be accessed to generate content options targeted to a specific user. For example, event ticketing companies, event promoters, weather information providers, map providers, restaurant reservation providers, transportation providers, hotels, or a plurality of other sources of information that may be of interest to users.

Figure 6:
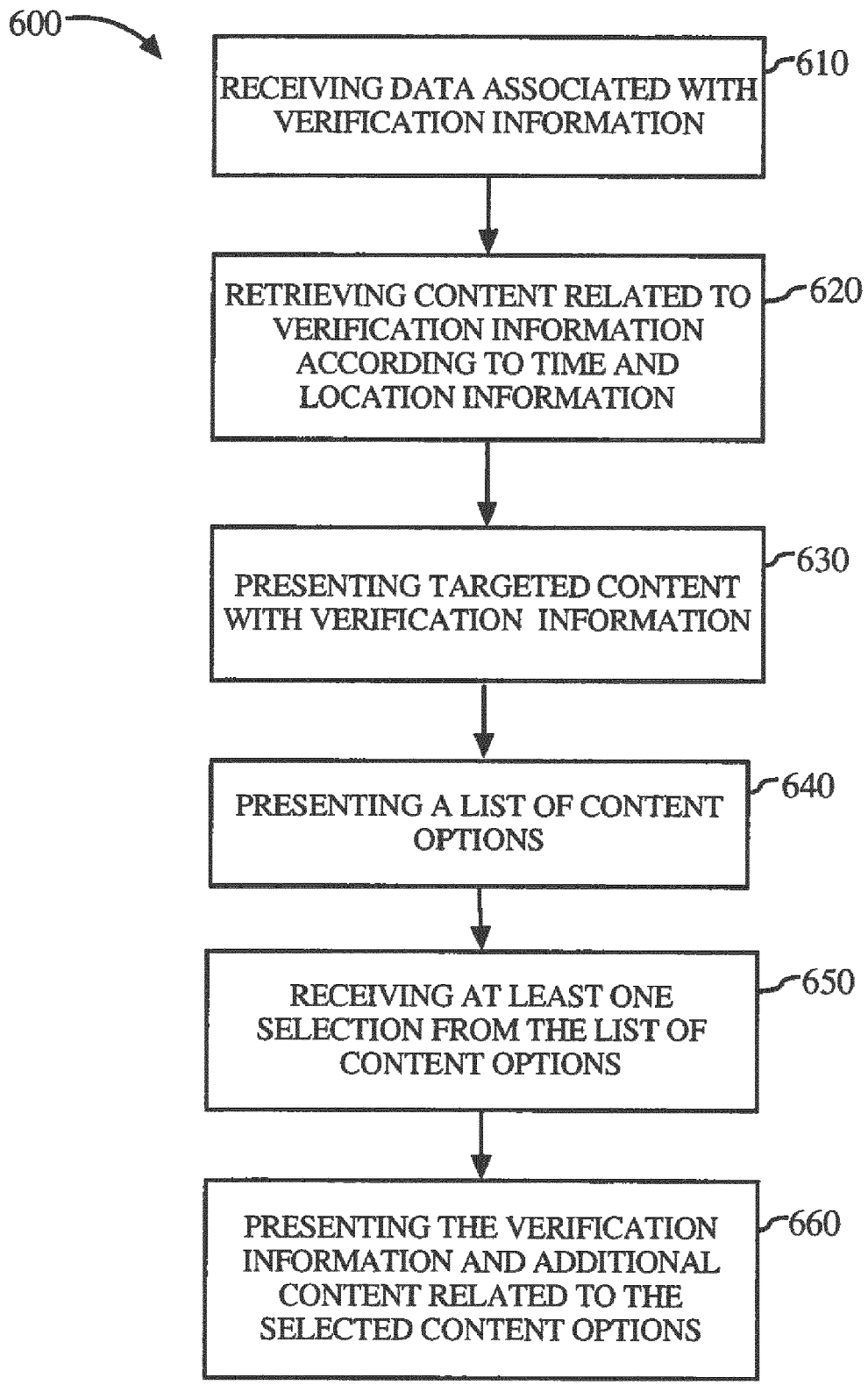
FIG. 6 depicts a method for providing targeted content with verification information which includes additional selectable content.

Referring to FIG. 6, a flow chart depicting a method 600 for providing targeted content with verification information which includes additional selectable content is shown. Method 600 providing targeted content with verification information which includes additional selectable content may include receiving data associated with the verification information 610. Data associated with verification information may include name or identity information, gender information, time information and location information and the like. It is contemplated that gender information may be based on identity information or a gender determination may be completed from name information. Verification information may refer to any type of information which may provide confirmation of identity, purchase, reservation, access and the like. It is contemplated that verification information may refer to a pass, ticket, confirmation document, receipt and the like. For example, verification information may refer to a boarding pass for entry onto a commercial flight. Data associated with the boarding pass may include a name, a time and date of a flight, a connecting flight, a destination and return flight(s). Method 600 may include retrieving content related to verification information and based upon time information and location information 620. Content may include information, such as graphics, images and text associated and related to the verification information. Content may include advertisements and may provide informative information for users at a particular time and location. The content may be further based upon the time information and location information, providing targeted content which is of a special interest to a user. Method 600 may further include presenting targeted content with verification information 630. While verification information may include a tangible item, such as a paper pass or ticket, verification information may also be implemented in an electronic form, such as a pass code and the like.

Method 600 may further include presenting a list of additional content for viewing with the verification information 640. For example, it is contemplated that the desired content customized to a particular user may be larger than capable of being presented in a single electronic interface or single sheet of paper, consequently, a list of additional content may be presented to the user. It is contemplated that the list of content options may further include preview content that may be presented to the user to assist the user in selection of content options. The list of content options may be further refined based upon the information associated with the verification information in order to present a list of content options which may be relevant to a particular user. Method 600 may include receiving content selections from the list of additional content options from the user 650 and presenting said boarding pass and additional content related to selections from the list of additional content options 660.

It is contemplated that the boarding pass and additional content may be formatted for printing on at least one standard page, such as a standard letter sheet of paper. For example, a boarding pass including said content related to a destination location is formatted for printing on a first page and additional selectable content is formatted for printing on at least a second page. Method 600 for providing additional selectable content may include formatting additional content on at least a second page by determining an amount of page space occupied by the additional content and inserting page breaks at locations wherein the content may be placed within individual pages. By comparing the amount of page space against a known range of content which occupies a standard page, a suitable number of pages for printing may be calculated. The amount of page space which fits within a standard page may be based upon a font of text and a number of alphanumeric characters within a given amount of content. Page breaks may be inserted in areas in which a break may be placed within text and may be located around HTML tags. It is further contemplated that content selections may be stored and may be utilized to update a user profile for future use and may be utilized to refine content options for similar users.

Figure 7:
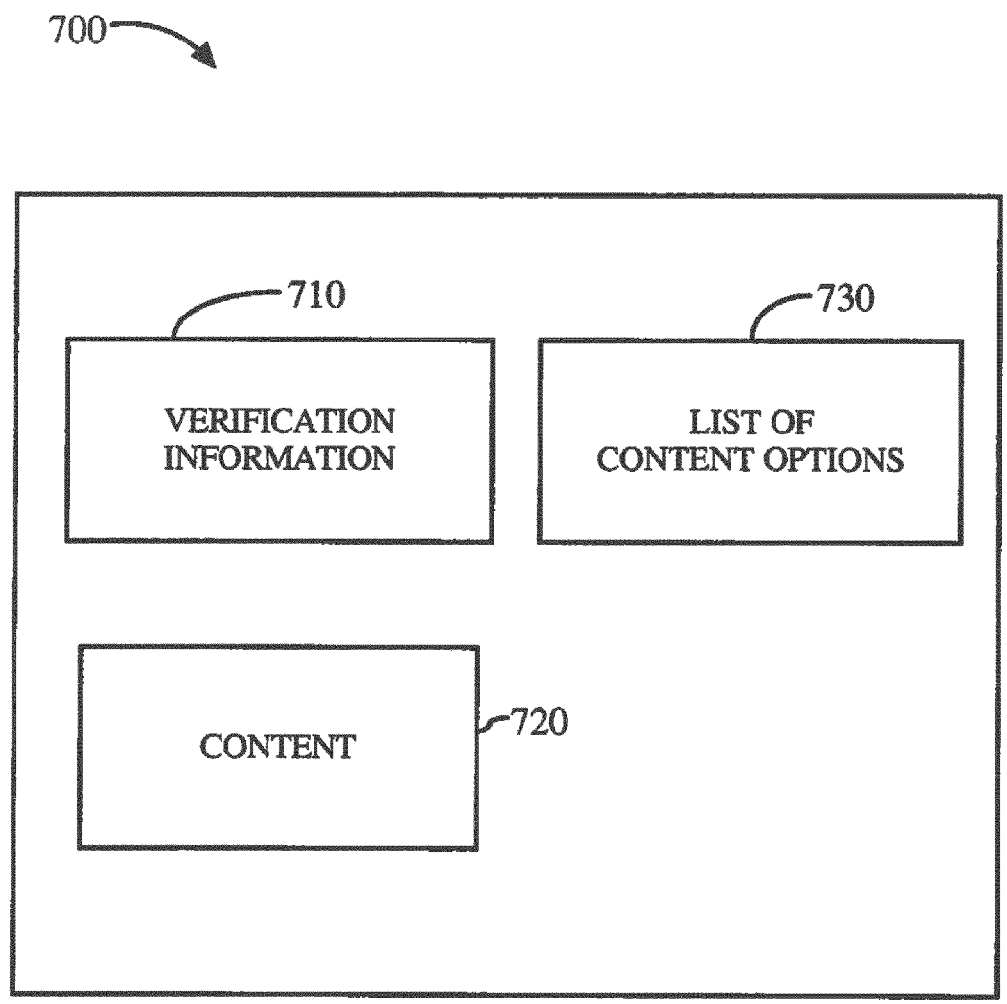
FIG. 7 depicts an exemplary graphical user interface.

Referring to FIG. 7, a method and system for generating verification information may produce a graphical user interface 700 which may include the verification information 710, content 720 which has been targeted to a specific user based upon data associated with the verification information 710. Additionally, a list of content options 730 for inclusion with the verification information may be presented to the user. Verification information, such as a boarding pass, may be printed by a user with the associated customized and formatted information. Verification information 710 may include a name, date, bar code or other type of authentication information and the like. Content 720 may include any graphics, text and information associated with the event for which the verification information may be intended. A list of content options 730 may include categories of content, such as upcoming events, business news editorials, news and sports highlights, coloring pages, book synopsizes, trip planning check lists, and other similar relevant content are presented as additional print options. Upon initial presentation of the list of content options, a limited number of content options may be presented to the user as shown in FIG. 8. These options may be presented based on the behavior of the user. Thus, if it were pre-determined that the person were a business user, the options presented would be related to business travel. Various content selections, demographics and behaviors collected during this process may be retained to further enhance the process of providing relevant and meaningful content. It is contemplated that the user may easily switch to a non-obtrusive expanded list of additional relevant content for which they can select to print as additions to their verification information as shown in FIG. 9. In addition, the user may optionally link to a site that provides a directory of additional options.

In one particular embodiment of the disclosure, upon receipt of a user to print a boarding bass, the boarding pass may be generated and may include content which is customized to the particular user. Additionally, a list of content options may be presented to the user which may enhance the travel experience by providing additional content that the user can print and take with them. Based upon user demographics and/or previous content selections, a primary category that is determined to best fit their interests may be predominately shown on one area of the electronic interface.

Additional content options are listed and are expandable in the interface. It is contemplated that moving a cursor over content listings, a long description and preview of the content may be displayed in a graphical user interface 700 as shown in FIG. 7. In addition, upon moving a cursor over the list of content options 730, a number of pages associated with printing that content may be displayed. Pre-selected and/or recommended content (additional boarding pass receipt for example) may be automatically selected as additional content selection. All selected content may be dynamically formatted and presented on the boarding pass(es). The formatting of the content may be suitable for printing, for example, printing on standard letter size sheets of paper. The data and content comes from a variety of sources and consequently a customized print template may be used in order to ensure consistent printing across browsers and printers in order to create a personalized print experience.

Retrieved content may come from a variety sources including but not limited to RSS feeds, content partnerships (magazine articles, editorials, blog postings, and the like) and custom content. Content may be moderated and categorized by individuals and by proprietary system algorithms in order to index and best match customer demographics and profiles. It is contemplated that retrieved content may be retrieved via web services which call a proprietary targeting content algorithm. In addition to this being an extension of a print option, this functionality may be implemented as an interstitial or as an additional page within the process the user is completing.

While targeted content may be retrieved based upon information associated with verification information, such as name, destination location and date, other demographic information may be included and utilized to refine content based upon the demographic information. Demographic information which may be obtained or calculated from an airline reservation may include, but is not limited to the following:

First name
Final destination
Destination
Duration of stay
Arrival date
Arrival time
Departure date
Departure time
Party size
Departure airport
Return flight
Service class
Booked date
Flight number
Gender
Age
Frequent flyer level
Return date
Language
Country
Currency
Payment method
Type of airplane equipment
Duration of flight
Length of flight in miles
Tail number of airplane
Booked with award travel While a process for use with a boarding pass has been described, it is contemplated that additional uses may be employed. In an instance of printing of an event ticket, additional content options related to that event may be displayed, such as parking tips, concert reviews, auditorium maps, and the like. Additional placements of this functionality could be (but not limited to) printing maps (additional print content being area restaurants, attractions, locations of people by last name, and the like), online order receipts (product warranty information, extended offers, and the like) and other items that are commonly printed via the web.

It is believed that the system of the present disclosure and many of its attendant advantages will be understood by the forgoing description. It is also believed that it will be apparent that various changes may be made in form, construction, and arrangement of the components thereof without departing from the scope and spirit of the disclosure or without sacrificing all of its material advantages. The form herein before described being merely an explanatory embodiment thereof.

What is claimed is:

1. A method, implemented as a program of instructions stored on a non-transitory computer-readable medium and executable by a processing unit, for providing content on a boarding pass, comprising:
   receiving data associated with a boarding pass, said data including a destination location and a departure date;
   retrieving content related to said destination location during a time period beginning on said departure date;
   presenting said content related to said destination location during a time period beginning on said departure date with said boarding pass;
   presenting a list of content options, said list of content options including categories of content related to said destination location during a time period beginning on said departure date;
   receiving at least one selection from said list of content options from a user; and
   presenting said boarding pass and additional content related to said at least one selection from said list of content options suitable for printing on at least one page.

2. The method as claimed in claim 1, wherein said destination location includes geographical city information.

3. The method as claimed in claim 1, wherein said content includes weather information.

4. The method as claimed in claim 1, wherein said content includes event information.

5. The method as claimed in claim 1, wherein said content includes advertisement information.

6. The method as claimed in claim 5, wherein said advertisement information includes event information.

7. The method as claimed in claim 1, wherein said content is further based upon gender information.

8. The method as claimed in claim 1, wherein said boarding pass including said content related to said destination location during said time beginning on said departure date is formatted for printing on a first page and additional content is formatted for printing on at least a second page.

9. A non-transitory computer-readable medium having computer-executable instructions executed by a processing unit for providing content on a boarding pass, comprising:
   receiving data associated with a boarding pass, said data including a destination location and a departure date;
   retrieving content related to said destination location during a time beginning on said departure date;
   presenting said content related to said destination location during said time beginning on said departure date with said boarding pass;

presenting a list of content options, said list of content options including categories of content related to said destination location during said time beginning on said departure date;

receiving at least one selection from said list of content options from a user; and presenting said boarding pass and additional content related to said at least one selection from said list of content options suitable for printing on at least one page.

10. The non-transitory computer-readable medium as claimed in claim 9, wherein said destination location includes geographical city information.

11. The non-transitory computer-readable medium as claimed in claim 9, wherein said content includes weather information.

12. The non-transitory computer-readable medium as claimed in claim 9, wherein said content includes event information.

13. The non-transitory computer-readable medium as claimed in claim 9, wherein said content includes advertisement information.

14. The non-transitory computer-readable medium as claimed in claim 13, wherein said advertisement information includes event information.

15. The non-transitory computer-readable medium as claimed in claim 9, wherein said content is further based upon gender information.

16. The non-transitory computer-readable medium as claimed in claim 15, wherein said content is further based upon origin location.

17. The non-transitory computer-readable medium as claimed in claim 16, wherein said content is further based upon at least one of duration of stay, departure airport, arrival airport, and return flight information.

18. The non-transitory computer-readable medium as claimed in claim 9, wherein said boarding pass including said content related to said destination location during said time between said departure date and said return date is formatted for printing on a first page and additional content is formatted for printing on at least a second page.

19. The non-transitory computer-readable medium as claimed in claim 9, wherein further comprising formatting said additional content on at least a second page by determining an amount of page space occupied by the content and inserting page breaks at locations wherein the content may be placed within individual pages.

20. A method, implemented as a program of instructions stored on a non-transitory computer-readable medium and executable by a processing unit, for providing content on a verification information document, comprising:

receiving data associated with a verification information document, said data including, a date, a location and event information;

retrieving content related to said event information on said date and at said location;

presenting said content related to said event information on said date and at said location with said verification information document;

presenting a list of content options, said list of content options including categories of content related to said destination location during said time between said departure date and said return date; and receiving at least one selection from said list of content options from a user; and presenting said verification information document and additional content related to said at least one selection from said list of content options suitable for printing.

21. The method as claimed in claim 20, wherein said verification information including said content related to said event information on said date and at said location is formatted for printing on a first page and additional content is formatted for printing on at least a second page.

* * * * *